(12) United States Patent
Zhang

(10) Patent No.: US 9,642,433 B2
(45) Date of Patent: May 9, 2017

(54) GELATINIZE HAIRDRESSING FOIL AND ITS PREPARATION METHOD THEREOF

(71) Applicant: Jian Zhang, Zhuozhou (CN)

(72) Inventor: Jian Zhang, Zhuozhou (CN)

( * ) Notice: Subject to any disclaimer, the term of this patent is extended or adjusted under 35 U.S.C. 154(b) by 261 days.

(21) Appl. No.: 14/410,714

(22) PCT Filed: Feb. 25, 2014

(86) PCT No.: PCT/CN2014/072529
§ 371 (c)(1),
(2) Date: Dec. 23, 2014

(87) PCT Pub. No.: WO2015/039414
PCT Pub. Date: Mar. 26, 2015

(65) Prior Publication Data
US 2016/0262519 A1    Sep. 15, 2016

(30) Foreign Application Priority Data

Sep. 18, 2013    (CN) ...................... 2013 2 0578305 U

(51) Int. Cl.
*A45D 2/00*    (2006.01)
*A45D 19/00*    (2006.01)
(Continued)

(52) U.S. Cl.
CPC ............ *A45D 19/0025* (2013.01); *A45D 6/00* (2013.01); *A45D 7/02* (2013.01); *A45D 7/045* (2013.01);
(Continued)

(58) Field of Classification Search
CPC ................ A45D 7/065; A45D 19/0008; A45D 19/0016; A45D 19/0025; A45D 7/02;
(Continued)

(56) References Cited

U.S. PATENT DOCUMENTS

2005/0028835 A1\*   2/2005   Husband ............ A45D 19/0025
                                                  132/270
2010/0083977 A1    4/2010   Goddard-Clark

FOREIGN PATENT DOCUMENTS

BR      MU8902184 U2    8/2010
CN          1658775 A    8/2005
(Continued)

OTHER PUBLICATIONS

International Search Report for PCT/CN2014/072529, Jun. 24, 2014.

*Primary Examiner* — Rachel Steitz
(74) *Attorney, Agent, or Firm* — Caesar Rivise, PC

(57) ABSTRACT

A gelatinize hairdressing foil and its preparation method are disclosed. One surface of said gelatinize hairdressing foil is a dark side, which contacts with hair, and an other surface of said gelatinize hairdressing foil is a bright side. Said dark side is provided with a zonal gelatinize layer. An anti-adhesive layer can be provided on said bright side. The hairdressing foil can contain an aluminum foil, can be provided with a release layer on said dark side, and can be provided with aluminum foils on both surfaces and a plastic film between said two aluminum foils. When quiff is put on said dark side, it is adhered by the release layer on the dark side. Therefore, the quiff is apt to form a layer instead of a tangle, and when liquid medicine for perming and dyeing is coated on hair, each hair could be coated with said liquid medicine.

16 Claims, 3 Drawing Sheets

(51) Int. Cl.
    *A45D 6/00*        (2006.01)
    *A45D 7/02*        (2006.01)
    *A45D 7/04*        (2006.01)
    *B05D 7/14*        (2006.01)
    *B05D 7/00*        (2006.01)
    *B32B 37/02*      (2006.01)
    *B32B 38/00*      (2006.01)
    *C23C 26/00*      (2006.01)
    *A45D 7/00*        (2006.01)

(52) U.S. Cl.
    CPC ............... *A45D 19/00* (2013.01); *B05D 7/14* (2013.01); *B05D 7/54* (2013.01); *B32B 37/02* (2013.01); *B32B 38/0004* (2013.01); *C23C 26/00* (2013.01); *A45D 2007/001* (2013.01); *A45D 2019/0091* (2013.01); *B32B 2255/24* (2013.01); *B32B 2311/24* (2013.01)

(58) Field of Classification Search
    CPC ............... A45D 6/00; A45D 2007/001; A45D 2019/0091; B05D 7/14; B05D 7/54; B32B 37/02; B32B 38/0004; B32B 2255/24; B32B 11/24; C23C 26/00
    See application file for complete search history.

(56) References Cited

FOREIGN PATENT DOCUMENTS

| | | |
|---|---|---|
| CN | 1907575 A | 2/2007 |
| EP | 0968840 A1 | 1/2000 |
| JP | H09191922 A | 7/1997 |
| JP | 2000157323 | 6/2000 |

\* cited by examiner

GELATINIZE HAIRDRESSING FOIL AND ITS PREPARATION METHOD THEREOF

TECHNICAL FIELD

The invention relates to hairdressing technology, and in particular, the invention relates to a gelatinize hairdressing foil for shaping or isolating hair in the process of perming or dyeing, and its preparation method thereof.

BACKGROUND ART

Generally, in the process of perming or dyeing, aluminum foil is used to wrap part of the hair coated by a hairdressing reagent or liquid medicine, and the aluminum foil is called hairdressing aluminum foil. In the prior art, said hairdressing aluminum foil is commonly a block in a shape which just has the proper size. About the improvement of hairdressing aluminum foil, the following improvements were proposed: an aluminum foil is cut into at least two pieces, and then the two aluminum foils are connected together with transparent material, so that a part of the hairdressing foil is transparent. With the hairdressing foil, the wrapped hair could be seen through the transparent part after the hair is wrapped, which would benefit controlling the process of hairdressing. However, there is still a problem that the wrapped hair usually gathers together and forms a tangle. Hair is diverged by a hair stylist in the process of perming, but after the hair is wrapped, the hair would gather together and form a tangle again. So, the hair is difficult to be coated by liquid medicine evenly. Therefore, the hair will be heated unevenly in the process of heating. Additionally, part of the hair usually should be separated from the other hair in the process of perming or dyeing. However, it is hard to fix the existing isolation medium on the hair.

SUMMARY OF THE INVENTION

The purpose of the present invention is to overcome the deficiencies in the prior art and to provide a gelatinize hairdressing foil and its preparation method thereof. With the hairdressing foil in the present invention, hair could be wrapped in the hairdressing foil and could be an even layer instead of a tangle, or the hairdressing foil could be fixed on the hair easily.

In order to realize the purpose of the present invention, the following technical solutions are proposed:

A gelatinize hairdressing foil, including aluminum foil, and when it is used, one surface of the gelatinize hairdressing is defined as a dark side, and the dark side contacts with the hair, and the other surface is defined as a bright side, wherein, said dark side is provided with a zonal gelatinize layer, and said bright side is provided with an anti-adhesive layer;

wherein, the color of said aluminum foil could be any one of all colors or at least two colors, preferably, the color is silver white.

Furthermore, said zonal gelatinize layer on the dark side is provided with a release layer.

Said gelatinize hairdressing foil with said zonal gelatinize layer on said dark side and said anti-adhesive layer on said bright side is roll in shape. When used, said hairdressing foil is cut into pieces to use.

Said gelatinize hairdressing foil with release layer on said zonal gelatinize layer could be bulk in shape. It could be used directly. Preferably, said gelatinize hairdressing foil is processed into removable boxed aluminum foil.

Said zonal gelatinize layer could be formed with pressure-sensitive adhesive, such as Pure acrylate copolymer emulsion, or hot melt adhesive. Said anti-adhesive layer could be formed with Poly (methyl vinyl siloxane). Said gelatinize layer is a zonal gelatinize layer running through said aluminum foil on a direction. Said zonal gelatinize layer has a width of 20-40 mm, such as 20 mm, 30 mm and 40 mm.

Said anti-adhesive layer is coated on said bright side evenly.

Said release layer could be cotton sliver with plastic film or non-woven fabrics with plastic film on said zonal gelatinize layer, and said plastic film contacts with said zonal gelatinize layer. Said cotton silver could be the cotton sliver of 14 g/m$^2$.

Preferably, said plastic film is polyethylene terephthalate film (PET) or polypropylene film (BOPP).

Said non-woven fabric is the non-woven fabric of 45-150 g/m$^2$. Said aluminum foil is preferably male and female face aluminum foil with a pressed decorative pattern.

Said hairdressing aluminum foil with release layer on said zonal gelatinize layer is bulk in shape.

Gelatinize hairdressing foil provided in the present invention is provided with a gelatinize layer on the dark side of the aluminum foil, and when it is used, quiff is put and adhered on said dark side of the aluminum foil, so, the quiff is apt to form a layer instead of a tangle. Therefore, due to the gelatinize layer and anti-adhesive layer, when it is applied to wrap hair in the process of coating hair with liquid medicine or heating, hair is easy to form and keep a state of layer instead of tangle. So that, when liquid medicine for perming and dyeing is coated on hair, each hair could be coated with said liquid medicine, and it would not damage the hair and scalp. After hair is wrapped, the hair would not gather together and form a tangle, and then they would be heated uniformly, which would improve the quality of perming and dyeing. In addition, when the gelatinize hairdressing is used to separate part of the hair from the other hair, the dark side faces to the hair. Due to the gelatinize layer, said aluminum foil could be fixed on the hair easily. So, with the gelatinize hairdressing foil provided in the present invention, for the operating person, it is much easier to apply said liquid medicine and make hair be wrapped, and the efficiency is improved greatly.

In any one of the above said technical solutions, said hairdressing foil includes two pieces of aluminum foil. One surface of said hairdressing foil is coated with zonal gelatinize layer, and the other side is coated with the anti-adhesive layer. Plastic film with longitudinal and transverse pulling force is provided between the two pieces of aluminum foil, and said plastic film and the two aluminum foils are compounded forming a structure that there are two aluminum foils on both sides which is transparent in the middle. The surface of the plastic film, which contacts with hair, is also coated with zonal gelatinize layer, and the other surface is also coated by anti-adhesive layer.

In any one of the above said technical solutions, preferably, said gelatinize hairdressing foil is processed into a removable boxed aluminum foil.

In addition, a method of preparing gelatinize hairdressing foil is provided in the invention, and said method includes the following steps:

a. Anti-adhesive layer is coated onto one surface of aluminum foil, b. Glue with a temperature of 100-130° C. is rolled onto the other surface of said aluminum foil under a pressure of 50-75 MPa, and said aluminum foil moves with a speed of 30-40 m/min, so that a zonal gelatinize layer with width of 20-40 mm is formed.

c. The aluminum foil with gelatinize layer and anti-adhesive layer is processed into finished products.

Preferably, said steps are carried out orderly.

Preferably, in any one of the above said technical solutions, after the completion of step b, a release layer is provided on said zonal gelatinize layer, and then step c is carried out.

Preferably, in any one of the above said technical solutions, prior to said three steps, aluminum foil and plastic film are cut into desired sizes, and they are compounded, and then step a, b and c are carried out orderly.

Preferably, in any one of the above said technical solutions, before step a, aluminum foil is embossed to form a decorative pattern.

Preferably, in any one of the above said technical solutions, the finished product is aluminum foil that could be removable boxed aluminum foil.

Preferably, in any one of the above said technical solutions, steps a and b can be carried out simultaneously.

The invention is described in detail with the following figures and embodiments.

DETAILED EMBODIMENTS

Further description of the present invention would be done in detail with the figures and embodiments.

Embodiment 1

Figure 1:
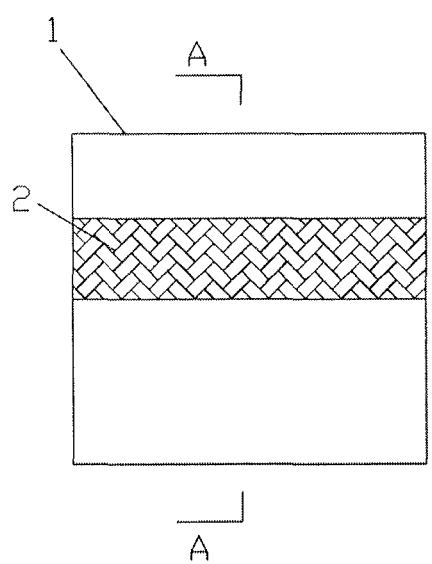
FIG. 1 is a schematic diagram of gelatinize hairdressing foil according to the present invention.
Figure 2:
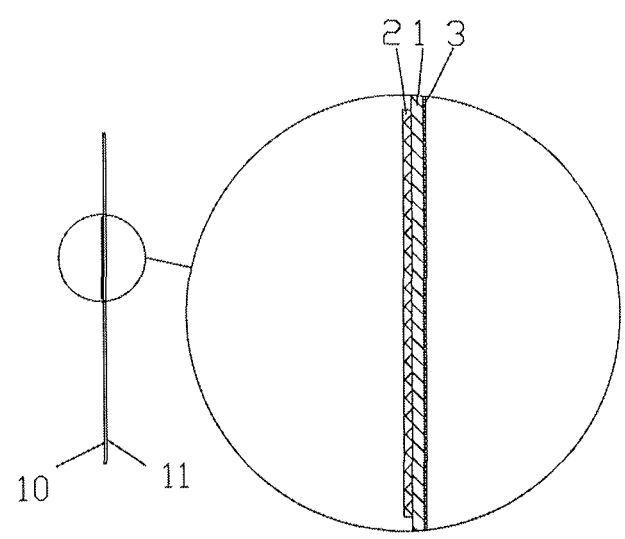
FIG. 2 is sectional A-A view of the gelatinize hairdressing foil shown in FIG. 1.

As shown in FIG. 1 and FIG. 2, a gelatinize hairdressing foil provided in the present invention includes an aluminum foil 1. When it is used, one surface, which contacts with hair, is defined as dark side 10, and the other surface faced to air is defined as bright side 11. Dark side 10 is provided with a zonal gelatinize layer 2 of 25 cm width.

Figure 3:
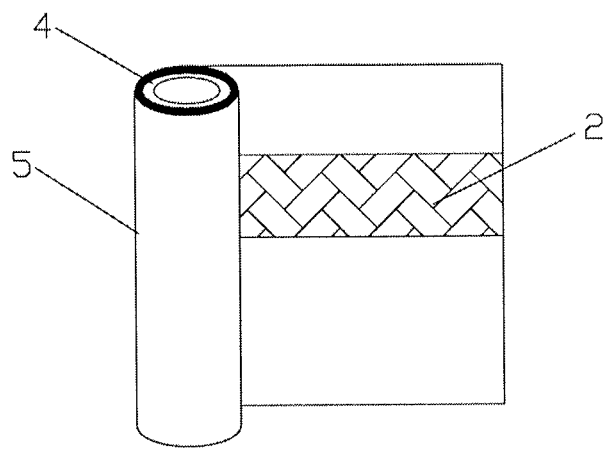
FIG. 3 is a schematic diagram of gelatinize hairdressing foil according to the present invention, wherein the gelatinize hairdressing foil is wound into a roll in shape.

In this embodiment, the bright side 11 is provided with anti-adhesive layer 3, wherein, the anti-adhesive is poly (methyl vinyl siloxane), and the anti-adhesive layer 3 is coated on the bright side 11 of aluminum foil 1. The gelatinize layer 2 formed with pressure-sensitive adhesive is pure acrylate copolymer emulsion. As shown in FIG. 3, the hairdressing foil provided in the present invention is zonal when it is finished. In the process of preparation, gelatinize layer is adhered onto one surface of zonal aluminum foil, and anti-adhesive is coated onto the other surface evenly. Then, the aluminum foil with gelatinize layer on one surface and anti-adhesive layer on the other surface is wounded into hairdressing foil rolls 5 around cardboard tube 4. If the anti-adhesive layer is not provided on the bright side and the aluminum foil with gelatinize layer is wounded directly, the gelatinize layer 2 would be adhered to the bright side of aluminum foil, which would result in that it would be very difficult to unfold the gelatinize hairdressing foil, and that the gelatinize layer would be damaged. In this embodiment, anti-adhesive is coated on bright side of aluminum foil 1; therefore, during the preparation, the gelatinize hairdressing aluminum foil would not be adhered to each other.

In this embodiment, the gelatinize hairdressing foil is prepared with the following steps:

a. Anti-adhesive is coated onto one surface of the aluminum foil by rolling at a speed of 35 m/min;

b. Glue with a temperature of 100° C. is rolled onto the other surface of the aluminum foil with an anti-adhesive layer under a pressure of 60 MPa, forming a zonal gelatinize layer with a width of 20 mm, wherein the aluminum foil with the anti-adhesive layer moves at a speed of 40 m/min.

c. The aluminum foil with the gelatinize layer and the anti-adhesive layer is processed into removable boxed aluminum foil.

The temperature of the glue could also be 110° C., 115° C., 120° C., 125° C. and 130° C., and the pressure could be 50 MPa, 55 MPa, 65 MPa, 70 MPa, and 75 MPa, and the speed with which the aluminum foil with anti-adhesive layer moves could be 30 m/min and 35 m/min. Therefore, the width of the zonal gelatinize layer could be 25 mm, 30 mm, 35 mm, and 40 mm.

The gelatinize hairdressing foil in the present invention can be used as follows:

Method 1: The gelatinize hairdressing aluminum foil is used to wrap hair. A gelatinize layer is provided at a fixed position on the dark side of aluminum foil. Quiff is put on the dark side, and hair would be adhered onto the gelatinize layer, therefore, the hair is easy to form an even layer instead of a tangle. So, when liquid medicine for perming or dyeing is applied onto hair, it is very easy to make each hair coated by liquid medicine evenly, and it would not damage the hair and scalp. After hair is wrapped, because the hair are adhered on said aluminum foil by said zonal gelatinize layer, so the hair would not gather together, and the hair would be heated evenly in process of heating. Therefore, the quality of perm and dyeing could be greatly improved.

Method 2: the gelatinize hairdressing aluminum foil is used to separate part of the hair from the other hair. The dark side of the aluminum foil contacts with hair. With the zonal gelatinize layer at a fixed position on the dark side of the aluminum foil, the gelatinize hairdressing aluminum foil adheres with hair that needed to be permed or dyed, and then, the edge of aluminum foil is folded. Another quiff is put on the bright side with anti-adhesive of aluminum foil to be dealt, for example, to be dyed. The gelatinize hairdressing foil is easy to be fixed on the hair. Therefore, for the operating person, it is much easier to apply said liquid medicine onto hair and make hair be wrapped, and the efficiency is improved greatly.

Gelatinize layer of the gelatinize hairdressing foil provided in the present invention is formed with pure acrylate copolymer emulsion. The glue used as gelatinize layer of gelatinize hairdressing foil should be easy to adhere to the hair, but the adhesion stress could not be too large, i.e. the gelatinize layer could be separated easily from the hair. If the viscosity of adhesive is too large, it is difficult to separate the gelatinize layer from the hair, and even, it need to tear out some hair to remove the gelatinize hairdressing foil. So, such glue is not suitable for using as gelatinize layer of gelatinize hairdressing foil. Said copolymerization emulsion or material having similar performance is suitable for use as gelatinize layer of gelatinize hairdressing foil.

Embodiment 2

Figure 4:
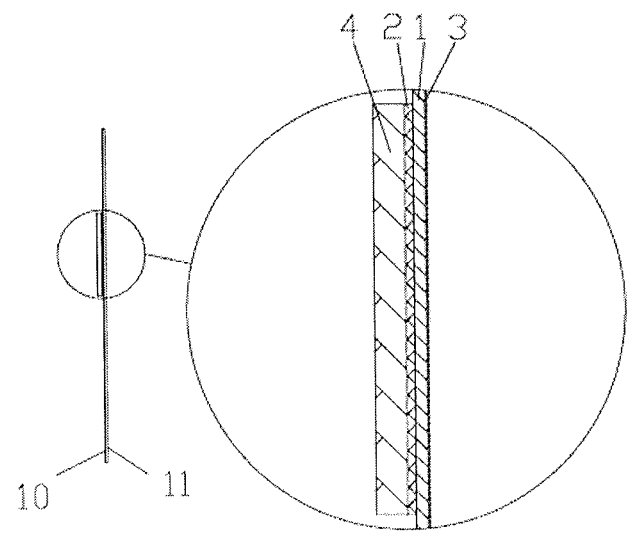
FIG. 4 is side view of gelatinize hairdressing foil according to the present invention, wherein the gelatinize hairdressing foil is provided with a release layer and is bulk in shape.

As shown in FIG. 4, another embodiment is provided in the present invention. On the basis of embodiment 1, gelatinize layer 2 on the dark side is provided with release layer, and the release layer could be non-woven fabric or cotton sliver with plastic film on one side. The side of plastic film of the release layer adheres to the gelatinize layer. Such structure has a function that preventing the adhesion to the gelatinize layer. In addition, when the hairdressing foil is used, the non-woven or cotton sliver on the gelatinize layer could be taken off and used as tool to apply liquid medicine onto hair.

Said cotton sliver can be cotton silver of 14 $g/m^2$.

Said Non-woven fabrics can be that of 45 $g/m^2$, 50 $g/m^2$, 80 $g/m^2$, or thickened non-woven fabrics of 100 $g/m^2$, 125 $g/m^2$, 150 $g/m^2$.

Said gelatinize layer 2 is zonal gelatinize layer which runs through the aluminum foil on a direction.

Said aluminum foil is male and female face aluminum foil with a pressed decorative pattern. Compared with smooth aluminum foil, this improves the adhesion of gelatinize layer or anti-adhesive layer to the aluminum foil.

The preparation method of gelatinize hairdressing foil in this embodiment is as follows:

a. Anti-adhesive is coated onto one surface of the aluminum foil by rolling at a speed of 30 m/min;

b. Glue with temperature of 120° C. is rolled onto the other surface of the aluminum foil with anti-adhesive layer under pressure of 55 MPa, forming a zonal gelatinize layer with width of 20 mm, wherein the aluminum foil with anti-adhesive layer moves at a speed of 40 m/min;

c. A cotton sliver or non-woven fabrics is adhered onto one surface of zonal gelatinize layer;

d. The aluminum foil with gelatinize layer and anti-adhesive layer is processed into removable boxed aluminum foil.

Embodiment 3

Figure 5:
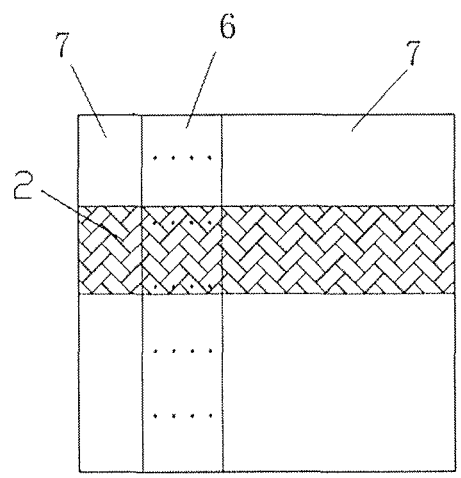
FIG. 5 is a schematic diagram of gelatinize hairdressing foil according to the present invention, wherein the gelatinize hairdressing foil has two aluminum foils on both sides and a transparent area in the middle.

As shown in FIG. 5, another gelatinize hairdressing foil is provided in the present invention, and it contains two pieces of male and female face aluminum foil 7 with pressed decorative patterns. The aluminum foil is provided with a zonal gelatinize layer with width of 20 mm on one surface and anti-adhesive layer formed with poly (methyl vinyl siloxane) on the other surface. PET plastic film 6 having longitudinal and transverse pulling force is provided between the two aluminum foils, and one surface of plastic film 6 also is provided with a zonal gelatinize layer, through which aluminum foil 7 and plastic film 6 are compounded together forming hairdressing foil with two aluminum foil on both sides and transparent area in the middle. The prepared hairdressing foil has zonal gelatinize layer 2 on its dark side, and anti-adhesive layer on its bright side. The hairdressing foil is processed into removable boxed aluminum foil, so that it is very convenient to take it and use it.

The hairdressing foil provided in this embodiment has the advantages of that in Embodiment 1. Meanwhile, it has a transparent area in the middle. Therefore, it is convenient to observe the process of perming or dyeing, which is good for controlling hairdressing process.

The preparation method of gelatinize hairdressing foil in this embodiment is as follows:

a. Aluminum foil is pressed with decorative patterns and cut into pieces, and plastic film is cut into pieces;

b. The cut aluminum foil and plastic film are compounded, forming structure having two aluminum foils on both sides and a transparent area in the middle;

c. Anti-adhesive is coated onto one surface of the aluminum foil having two aluminum foils on both sides and transparent area in the middle by rolling at a speed of 40 m/min;

d. Glue with temperature of 120° C. is rolled onto the other surface of the aluminum foil with anti-adhesive layer under pressure of 55 MPa, forming a zonal gelatinize layer with width of 20 mm, wherein, the aluminum foil with anti-adhesive layer moves at a speed of 40 m/min;

e. The aluminum foil with gelatinize layer and anti-adhesive layer is processed into removable boxed aluminum foil. The prepared hairdressing foil has zonal gelatinize layer 2 on its dark side, and anti-adhesive layer on its bright side. The hairdressing foil is processed into removable boxed aluminum foil, so that it is very convenient to take it and use it.

The hairdressing foil provided in this embodiment has the advantages of that in Embodiment 1. Meanwhile, it has a transparent area in the middle. Therefore, it is convenient to observe the process of perming or dyeing, which is good for controlling hairdressing process.

The preparation method of gelatinize hairdressing foil in this embodiment is as follows:

a. Aluminum foil is pressed with decorative patterns and cut into pieces, and plastic film is cut into pieces;

b. The cut aluminum foil and plastic film are compounded, forming structure having two aluminum foils on both sides and transparent area in the middle;

c. Anti-adhesive is coated onto one surface of the aluminum foil having two aluminum foils on both sides and transparent area in the middle by rolling at a speed of 40 m/min;

d. Glue with temperature of 120° C. is rolled onto the other surface of the aluminum foil with anti-adhesive layer under pressure of 55 MPa, forming a zonal gelatinize layer with width of 20 mm, wherein, the aluminum foil with anti-adhesive layer moves at a speed of 40 m/min;

e. The aluminum foil with gelatinize layer and anti-adhesive layer is processed into removable boxed aluminum foil.

What is claimed:

1. A gelatinize hairdressing foil, wherein one surface of the gelatinize hairdressing foil is defined as a dark side and an other surface is defined as a bright side wherein, said dark side is provided with a zonal gelatinize layer, and said bright side is provided with an anti-adhesive layer, and wherein said hairdressing foil contains two pieces of aluminum foil, and a plastic film is between said two pieces of aluminum foil, and the two pieces of aluminum foil are compounded together with said plastic film.

2. The gelatinize hairdressing foil according to claim 1, wherein said gelatinize hairdressing foil is provided with the zonal gelatinize layer on the dark side and the anti-adhesive layer on the bright side is roll in shape.

3. The gelatinize hairdressing foil according to claim 1, wherein said zonal gelatinize layer on the dark side is provided with a release layer.

4. The gelatinize hairdressing foil according to claim 3, wherein said release layer is cotton sliver with plastic film or non-woven fabric with plastic film on said zonal gelatinize layer, and said plastic film is contacted with said zonal gelatinize layer.

5. The gelatinize hairdressing foil according to claim 3, wherein said hairdressing foil with the release layer on said zonal gelatinize layer is bulk in shape.

6. The gelatinize hairdressing foil according to claim 4, wherein said cotton sliver is formed with 14 g/m$^2$ cotton sliver, or said non-woven fabric is formed with 45-150 g/m$^2$ non-woven fabrics.

7. The gelatinize hairdressing foil according to claim 4, wherein said zonal gelatinize layer is ribbon in shape, and said zonal gelatinize layer runs through one of the pieces of aluminum foil on a direction; and/or the width of the zonal gelatinize layer is 20-40 mm.

8. The gelatinize hairdressing foil according to claim 4, wherein said plastic film is formed with PET or BOPP.

9. The gelatinize hairdressing foil according to claim 1, wherein said zonal gelatinize layer is formed with pressure-sensitive adhesive, or with hot melt adhesive; or said zonal gelatinize layer is formed with pure acrylate copolymer emulsion.

10. The gelatinize hairdressing foil according to claim 1, wherein said anti-adhesive layer is Poly (methyl vinyl siloxane) or other materials playing an anti-adhesive role.

11. The gelatinize hairdressing foil according to claim 1, wherein one of said pieces of aluminum foil is male and female face aluminum foil with a pressed decorative pattern.

12. The gelatinize hairdressing foil according to claim 1, wherein said plastic film is formed with PET or BOPP.

13. The gelatinize hairdressing foil according to claim 1, wherein said hairdressing foil is processed into removable boxed aluminum foil.

14. A method for preparing gelatinize hairdressing foil comprising the following steps:
 a. an anti-adhesive layer is formed on one surface of aluminum foil;
 b. a glue with a temperature of 100-130° C. is rolled and coated onto an other surface of said aluminum foil with an anti-adhesive layer under a pressure of 50-75 MPa, and said aluminum foil moves with a speed of 30-40 m/min, whereby, a zonal gelatinize layer is formed with a width of 20-40 mm, and
 c. aluminum foil with the zonal gelatinize layer and the anti-adhesive layer is made into finished products.

15. The method for preparing gelatinize hairdressing foil according to claim 14, wherein after the completion of step b, a release layer is provided on said zonal gelatinize layer, and then step c is carried out.

16. The method for preparing gelatinize hairdressing foil according to claim 14, wherein prior to said three steps, the aluminum foil and a plastic film are cut into desired size, and they are compounded, and then steps a, b, and c are carried out orderly.

* * * * *